(12) United States Patent
Kingston-Jones

(10) Patent No.: US 9,637,158 B2
(45) Date of Patent: May 2, 2017

(54) STEERING COLUMN ASSEMBLY

(71) Applicant: TRW Limited, Solihull, West Midlands (GB)

(72) Inventor: Harry Kingston-Jones, Solihull (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 15/105,765

(22) PCT Filed: Dec. 23, 2014

(86) PCT No.: PCT/GB2014/053837
§ 371 (c)(1),
(2) Date: Jun. 17, 2016

(87) PCT Pub. No.: WO2015/097474
PCT Pub. Date: Jul. 2, 2015

(65) Prior Publication Data
US 2017/0021855 A1    Jan. 26, 2017

(30) Foreign Application Priority Data

Dec. 27, 2013 (GB) .................................. 1323068.5

(51) Int. Cl.
*B62D 1/18* (2006.01)
*B62D 1/184* (2006.01)
*B62D 1/185* (2006.01)

(52) U.S. Cl.
CPC ............. *B62D 1/184* (2013.01); *B62D 1/185* (2013.01)

(58) Field of Classification Search
CPC combination set(s) only.
See application file for complete search history.

(56) References Cited

U.S. PATENT DOCUMENTS 5,476,284 A    12/1995  DuRocher et al.
5,664,806 A    9/1997   Vortmeyer et al.
(Continued)

FOREIGN PATENT DOCUMENTS

DE    102010007823 A1    8/2011
GB    2459959 A    *    11/2009    ............... B62D 1/16
(Continued)

OTHER PUBLICATIONS

Patents Act 1977: Search Report under Section 17, Application No. GB1323068.5 dated Jul. 9, 2014.
(Continued)

*Primary Examiner* — Nicole Verley
(74) *Attorney, Agent, or Firm* — MacMillan, Sobanski & Todd, LLC

(57) ABSTRACT

A steering column assembly comprising an inner tube and an outer tube that surrounds the inner tube along at least part of its length, in a relaxed condition the outer tube being a relatively loose fit around the inner tube, an elongate slot in the outer tube which can be at least partially closed by applying a load either side of the slot to cause a reduction in the internal diameter of the tube, the slot extending along the outer tube starting from one end of the tube, a pair of flanges which are fixed to the tube on opposing sides of the slot, and a clamp mechanism which connects one flange to the other, the clamp mechanism being movable between a clamped position in which it applies a clamping force to the flanges that acts to reduce the width of the slot and so tightens the outer tube around the inner tube, and an unclamped position in which the clamping force is reduced to permit the flanges to move away from one another as the tube returns towards its relaxed condition. A restraining member that extend around the whole outside of the circumference, or substantially around the whole circumference, of a length of the (Continued)

outer tube that is located at, or close to, the end of the outer tube at which the slot starts, the restraining member preventing unwanted deformation of the end of the outer tube.

10 Claims, 4 Drawing Sheets

(56) References Cited

U.S. PATENT DOCUMENTS

| | | | | |
|---|---|---|---|---|
| 8,997,602 | B2* | 4/2015 | Tanaka | B62D 1/184 |
| | | | | 280/775 |
| 9,452,772 | B2* | 9/2016 | Owens | B62D 1/184 |
| 2006/0028010 | A1* | 2/2006 | Yamada | B62D 1/184 |
| | | | | 280/775 |
| 2007/0151392 | A1* | 7/2007 | Oshita | B62D 1/195 |
| | | | | 74/493 |
| 2010/0139439 | A1* | 6/2010 | Uesaka | B62D 1/184 |
| | | | | 74/493 |
| 2010/0242664 | A1 | 9/2010 | Thompson et al. | |
| 2011/0265599 | A1* | 11/2011 | Owens | B62D 1/184 |
| | | | | 74/493 |
| 2012/0324965 | A1 | 12/2012 | Yamamoto et al. | |
| 2013/0160596 | A1* | 6/2013 | Tanaka | B62D 1/185 |
| | | | | 74/493 |
| 2013/0213174 | A1* | 8/2013 | Suzuki | B62D 1/187 |
| | | | | 74/493 |

FOREIGN PATENT DOCUMENTS

| | | | | |
|---|---|---|---|---|
| GB | 2459959 B | * | 8/2012 | B62D 1/16 |
| GB | WO 2015185892 A1 | * | 12/2015 | B62D 1/184 |
| JP | EP 2193976 A2 | * | 6/2010 | B62D 1/184 |
| JP | 2011042305 A | | 3/2011 | |
| JP | WO 2012111453 A1 | * | 8/2012 | B62D 1/184 |
| KR | 20080095473 A | | 10/2008 | |

OTHER PUBLICATIONS

International Search Report and the Written Opinion, Application No. PCT/GB2014/053837 filed Dec. 23, 2014, dated Apr. 8, 2015.

\* cited by examiner

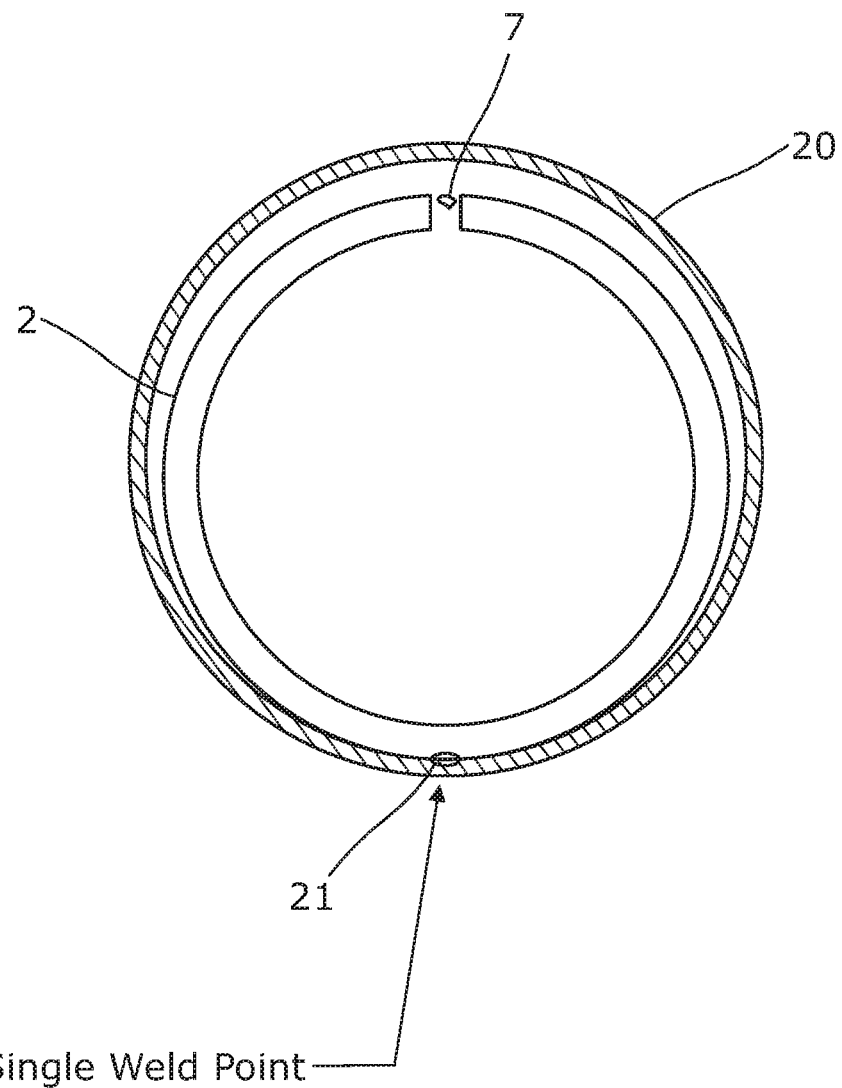
Fig. 5 (clamped)

STEERING COLUMN ASSEMBLY

CROSS-REFERENCE TO RELATED APPLICATIONS

This application is a national stage of International Application No. PCT/GB2014/053837, filed 23 Dec. 2014, the disclosures of which are incorporated herein by reference in entirety, and which claimed priority to Great Britain Patent Application No. 1323068.5, filed 27 Dec. 2013, the disclosures of which are incorporated herein by reference in entirety.

BACKGROUND OF THE INVENTION

This invention relates to improvements in steering column assemblies. It also relates to a method of assembling a steering column assembly.

Steering columns for vehicles, such as cars, are increasingly required to have the ability to change length. With the prevalence of airbags, it is important that the wheel is not placed too close to a driver nor too far away. Allowing the length to be adjusted allows the driver to set the correct "reach" of the steering column. The requirement for a change in length is also important in a crash, as the column should be able to collapse under impact to reduce the forces on the driver's chest if it strikes the steering wheel.

One of the simplest ways to achieve the required length adjustment is to provide a two-part column that comprises an inner tube and an outer tube with the inner tube being able to slide within the outer in the manner of a traditional telescope. These assemblies are known as tube-in-tube steering columns. A typical tube in tube column assembly is shown in FIG. 1 of the accompanying drawings; whilst this shows part of an electric power assisted steering system, the invention itself is not so limited. The inner and outer tubes define a shroud which sits around, supports and protects a collapsible steering shaft that is connected to the steering wheel of the vehicle.

Where a column assembly of the kind shown in FIG. 1 is adjustable for reach and or rake (up and down movement) the outer tube must be held rigidly by a releasable clamp mechanism to a column support bracket that is fixed to the vehicle body structure. Ideally, the clamp system would lock the outer tube in place and simultaneously cause the outer tube to grip the inner tube. The benefits of this would be: (a) to maximise the bending stiffness of the total column assembly in the clamped position and (b) to ensure there is a predictable amount of sliding friction between the inner and outer tubes, in the clamped condition, which can contribute a specified proportion of the total energy-absorbing crash force required in a crash, and (c) in cases where reach adjustment is to be provided, to allow the inner and outer tube to freely slide in an unclamped condition.

Clamping a continuous cylindrical outer tube onto an inner tube requires a high clamp force (a tube naturally does not easily compress without unwanted buckling), so to reduce the force needed it is known to provide an elongate slot in the outer tube. A pair of flanges is provided, one on each side of the slot. The flanges can be forced together by a suitable clamp mechanism when in the clamped position to at least partially close the edges of the slot together. A clamp mechanism that includes a clamp pin that passes through the flanges has been proposed to provide this load to the flanges.

The applicant has appreciated that a potential problem with such a steering column assembly is that when unclamped the amount of free play between the inner and outer tubes is hard to control. The inner diameter of the outer tube is not always consistent between samples, deformation often occurring during machining of the slot into the tube. US2010/0242664A1 discloses an arrangement where a catch is secured at one end to one of the flanges and catches a part of the other flange at its other end, the catch preventing movement of the flanges beyond a position in which the inner diameter of the outer tube is equal to a predetermined maximum value.

BRIEF SUMMARY OF THE INVENTION

An aim of the present invention is to ameliorate problems that have been identified in prior art arrangements such as that disclosed in the above mentioned US patent application.

According to the present invention there is provided a steering column assembly comprising:

an inner tube and an outer tube that surrounds the inner tube along at least part of its length, in a relaxed condition the outer tube being a relatively loose fit around the inner tube, an elongate slot in the outer tube which can be at least partially closed by applying a load either side of the slot to cause a reduction in the internal diameter of the tube, the slot extending along the outer tube starting from one end of the tube, a pair of flanges which are fixed to the tube on opposing sides of the slot, and a clamp mechanism which connects one flange to the other, the clamp mechanism being movable between a clamped position in which it applies a clamping force to the flanges that acts to reduce the width of the slot and so tightens the outer tube around the inner tube, and an unclamped position in which the clamping force is reduced to permit the flanges to move away from one another as the tube returns towards its relaxed condition, and further comprising a restraining member that extends around the outside of the whole circumference, or substantially around the whole circumference, of a length of the outer tube that is located at, or close to, the end of the outer tube at which the slot starts, the restraining member preventing unwanted deformation of the end of the outer tube.

The restraining member preferably comprises a continuous (endless) hoop or ring or a substantially continuous hoop or ring. The outer tube may pass through this hoop and the end may be located within the hoop or protrude from it.

The provision of the hoop member is advantageous as it prevents the end of the tube from flaring open in the event that a side load is applied. This situation could arise during a crash if the steering column is subjected to high side loads. This flaring could reduce the friction between the inner and outer tube, leading to poor control of the collapse forces during a crash. It is also likely to leave the steering assembly permanently deformed and beyond repair. Because of the slot in the tube, it would otherwise be very easy to flare when a high load is present.

The hoop member may comprise a simple endless ring (a complete loop), through which the outer tube passes. The hoop is a separate, discrete, component through which the outer passes and which controls the shape of the outer tube in the region where is passes through the hoop. A simple ring is preferred as it allows the hoop to take up a minimum space for a given rigidity of the hoop and is both simple and inexpensive to produce as well as being easy to manufacture precisely using common machine tools or presses and molds.

Of course, the hoop could comprise less than a complete loop, such as a loop with a slot in it, provide that it is sufficiently rigid to restrain the expansion or deformation of the outer tube as appropriate. For instance, it could have a slot in it that is located diametrically opposite the slot in the outer tube.

The term "restraining member", should, therefore, be given a broad interpretation and not be limited to a simple ring shape. Any member which has a suitable opening through which the outer tube may pass can be considered to fall within the scope of the term hoop. It need not have an inner shape that compliments the outer shape of the tube perfectly when the clamp mechanism is unclamped, and could instead perhaps have a series of ridges or protrusions, spaced evenly or unevenly around the inside of the opening whose crests provide the control of the expansion of the outer tube, just as well as having a smooth inner surface that gives uniform contact with the outer tube when it is unclamped. Similarly the outer shape of the hoop is largely inconsequential apart from giving control to the rigidity of the hoop.

Preferably the hoop, or ring, is located right at the end of the outer tube so that the end of the tube is surrounded by the collar. By this we mean that it surround a circumferential portion of the outer face of the tube that is bounded by the end face of the outer tube.

The hoop may comprise a metal hoop. For example, it may be cast or molded or stamped as a single metal component. The hoop should be inelastic, so that it does not stretch when subject to any force that it may be subjected to by the outer tube when the steering assembly is in use, as any stretching would compromise its ability to stop the outer tube flaring. It is also preferably resilient, so that as well as not being able to stretch elastically it does not change its cross section. A metal hoop with a thickness (the spacing between the inner and outer diameter) of at least 3 mm or 5 mm or more could be used but other materials could be used as well such as composite materials, e.g. carbon fibre materials.

The restraining member may be rigidly secured to the outer tube in at least one location, preferably to a portion of the outer tube that is diametrically opposite the slot. For example, if it is a continuous ring it could be fixed at one point diametrically opposite the slot in the outer tube. If it is not continuous, such as a c-shaped ring with a slot defining opposed ends of the ring, the two ends could be secured to the outer tube at locations spaced apart from the slot in the outer tube.

It is preferred that there is no rigid connection between the tube and the restraining member within the region that contains the slot, for instance no connection over an angle of at least 45 degrees, or at least 90 degrees, or at least 135 degrees, each side of the slot.

A single spot weld connecting a continuous ring to the outer tube is preferred as it is the simplest to manufacture and assemble and has high rigidity whilst providing minimal opposite to uniform reduction in the diameter of the outer tube by the clamp mechanism.

Where the restraining member comprises a simple ring the inner diameter of the ring may be selected such that with the clamp mechanism in an unclamped condition the outer tube has expanded to a fully circular, un-deformed, position an yet nay further opening on the outer tube is constrained by the ring. For instance, when unclamped the outer surface of the outer tube may be in full contact with the inside of the ring (matched diameters). The ring then stops any further expansion of the outer tube.

In addition to preventing flaring the hoop member can be configured to precisely control the inner diameter of the outer tube when in the unclamped condition. This enables the hoop member to provide the additional function of controlling the friction of the unclamped assembly during adjustment for reach. A catch, such as that taught in, is then no longer required.

The clamp mechanism may comprise a clamp pin that passes between the elongate slots in the two flanges. The elongate slots allow the outer tube to adjust for reach relative to the clamp pin. One end of the clamp pin may be provided with a captive nut or fixed head, and the other may be provided with a cam mechanism that is prevented from leaving the pin by a further nut or head. The cam mechanism may be operated by a lever.

A support bracket may be provided which is secured to a fixed part of a vehicle body structure. This may comprise an inverted u-shaped bracket, and the clamp pin may pass through openings in the dependent arms of the bracket. These arms may lies outside of each vertical wall of the flanges. When clamped the clamp mechanism may press the arms onto the vertical walls of the bracket simultaneous with clamping the outer tube to the inner tube. In this arrangement, excessive expansion of the outer tube that may otherwise arise if the hoop was not present could make rake adjustment difficult due to friction between the outer faces of the flanges and the inner faces of the bracket arms as the bracket tries to restrain the expansion.

The inner and outer tubes may accommodate a two part collapsible steering shaft. This may be located by one or more bearings journaled to the inner tube and/or outer tube.

The elongate slot may be aligned with the centre line of the outer tube, although this is not essential. It may, for example, spiral around the outer tube. All that is required is that as loading the flanges closes up the slot, the inner diameter of the tubes will reduce. It should, however, extend right to the end of the tube.

Also, whilst the invention is described in terms of tube, these need not have perfectly cylindrical cross-sections. The inner and outer tubes may, for example, be ovalised.

The openings in the u-shaped bracket may be slightly larger than the diameter of the pin. Alternatively, the openings may comprise generally vertical elongate slots, the clamp pin being free to move up and down the slots when in the unclamped position to permit rake adjustment of the steering column.

The outer tubular member may be located closer to the steering wheel than the inner tubular member, the hoop member being located at the end of the outer tubular member that is furthest from the steering wheel.

Other advantages of this invention will become apparent to those skilled in the art from the following detailed description of the preferred embodiments, when read in light of the accompanying drawings.

BRIEF DESCRIPTION OF THE DRAWINGS

FIG. 5 is a cross section view corresponding to FIG. 2 but only showing the end of the outer tube and the collar with the assembly in the fully clamped condition.

DETAILED DESCRIPTION OF THE INVENTION

Figure 1:
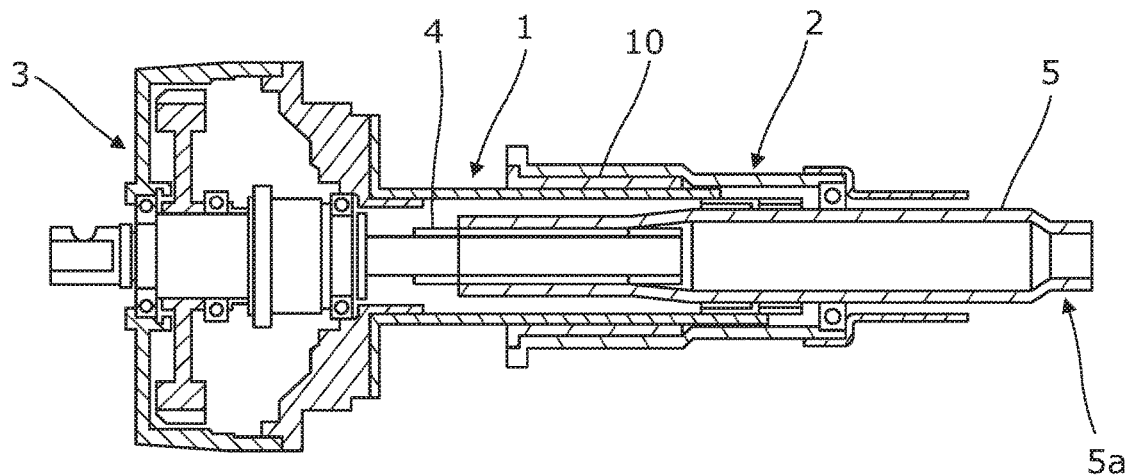
FIG. 1 is a cross sectional side view of a steering column assembly.

A steering column assembly comprises an inner tube 1, which is a sliding fit within an outer tube 2. One end of the inner tube connects to a gearbox housing 3 for an electric power steering system, although this is optional. The gearbox housing 3 is fixed to a part of the vehicle body structure so that the column can pivot to allow for rake adjustment.

Within the inner and outer tubes is a two part, telescopic, steering shaft comprising upper and lower shaft portions 4, 5. This connects to the gearbox at one end and to a steering wheel (not shown) at its other end 5a. It can also collapse in the event of a crash, or to follow sliding movement of the inner and outer tubes. This provides some reach adjustment to the steering wheel.

Figure 4:
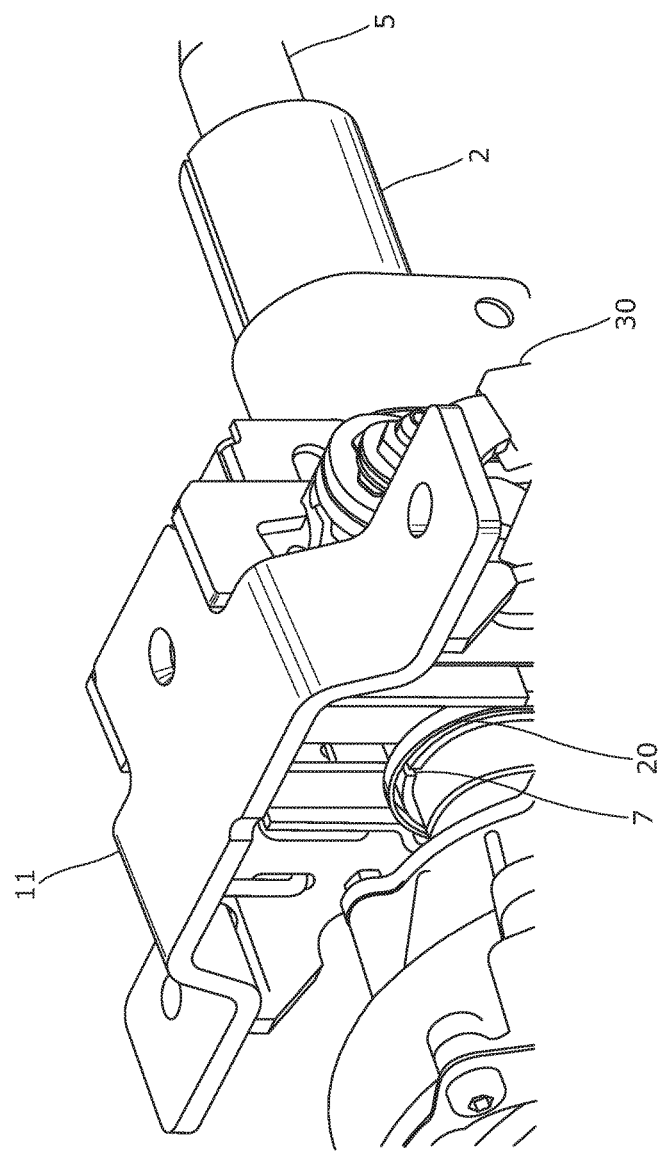
FIG. 4 is a perspective view of part of the assembly showing the location of a ring shaped restraining member on the end of the outer tube.

To permit the outer tube 2 to grip the inner tube 1, it is provided with an elongate slot 7 that is aligned with the centre line 2a of the outer tube 2. The slot extends right to one end of the outer tube as shown in FIG. 4. On each side of the slot 7 is a flange 8, 9. As will be described, the flanges 8, 9 can be forced together to cause the slot 7 partially to close up. This reduces the effective internal diameter of the outer tube 2 until it grips the inner tube 1. An intermediate shim or collar 10 can be located between the inner and outer tubes, and the outer tube will grip the inner tube through this shim.

Figure 2:
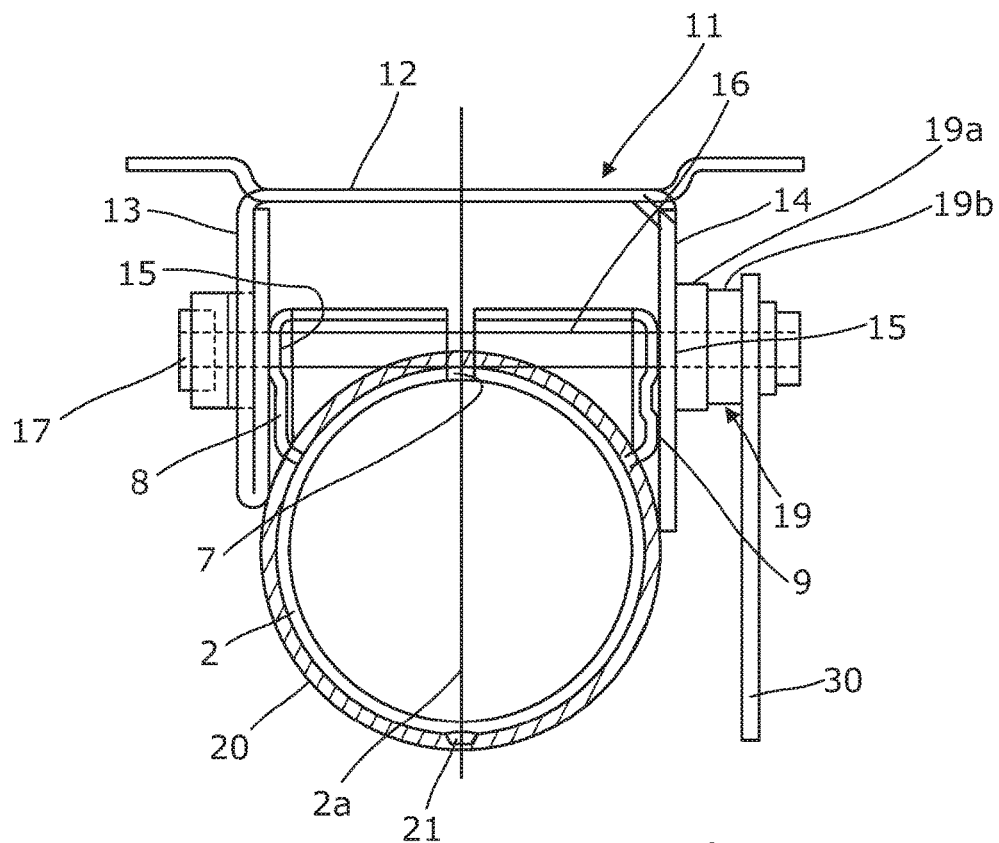
FIG. 2 is a cross sectional view in elevation of a part of a clamp assembly in accordance with the present invention that can be included in the steering assembly of FIG. 1, the assembly shown in an unclamped condition.

FIG. 2 shows how the outer tube 2 is fixed to the vehicle structure. A u-shaped bracket 11 is secured to a fixed part of the vehicle. The centre line of the outer tube 2 is located below the centre line of the bracket 11, with the flanges 8, 9 extending vertically upwards towards the base 12 of the bracket 11. The downwardly depending arms 13, 14 of the u-shaped bracket 11 are positioned so that they lie outside of, and with their inner faces in contact with, the outer faces of the vertical flanges 8, 9.

Both the flanges 8, 9 and the depending arms 13, 14 of the bracket 11 are provided with slots 15 and a clamp mechanism including a clamp pin 16 (shown in FIG. 2 only) passes through the slots 15 in the arms 13, 14 and the flanges 8, 9. The outer tube 2 can therefore hang from the pin 16, which is held up by the arms of the bracket 11. Lateral movement of the outer tube is prevented by interaction between the arms of the bracket and the flanges.

One end of the clamp pin 16 is provided with a nut or head 17 that is located outside of the adjacent arm 13 of the u-shaped bracket and is dimensioned so that it cannot be pulled through the slot 15 in the bracket arm by pulling on the clamp pin 16. The other end of the pin 16 is also provided with a nut 18. A cam mechanism 19 is provided between the nut and the outer face of the adjacent arm of the bracket. It comprises a cam race 19a having dogs engaging with the vertical slot 15 in the arm 14 so it cannot rotate, and a cam follower 19b that can rotate around the pins axis. A handle, in the form of a lever 30 is provided which enables a driver to rotate the cam follower 19b of the cam mechanism. This movement varies the length of the cam mechanism 19 (when measured along the axis of the pin). When the cam mechanism is at its shortest length, the arms of the bracket rest in an unstrained position. When it is at its longest length, the arms of the bracket are clamped onto the vertical flanges, which in turn apply a load to each side of the slot in the outer tube. The load causes the slot 7 to close up, at least partially, and the outer tube 2 clamps to the inner tube 1.

Figure 3:
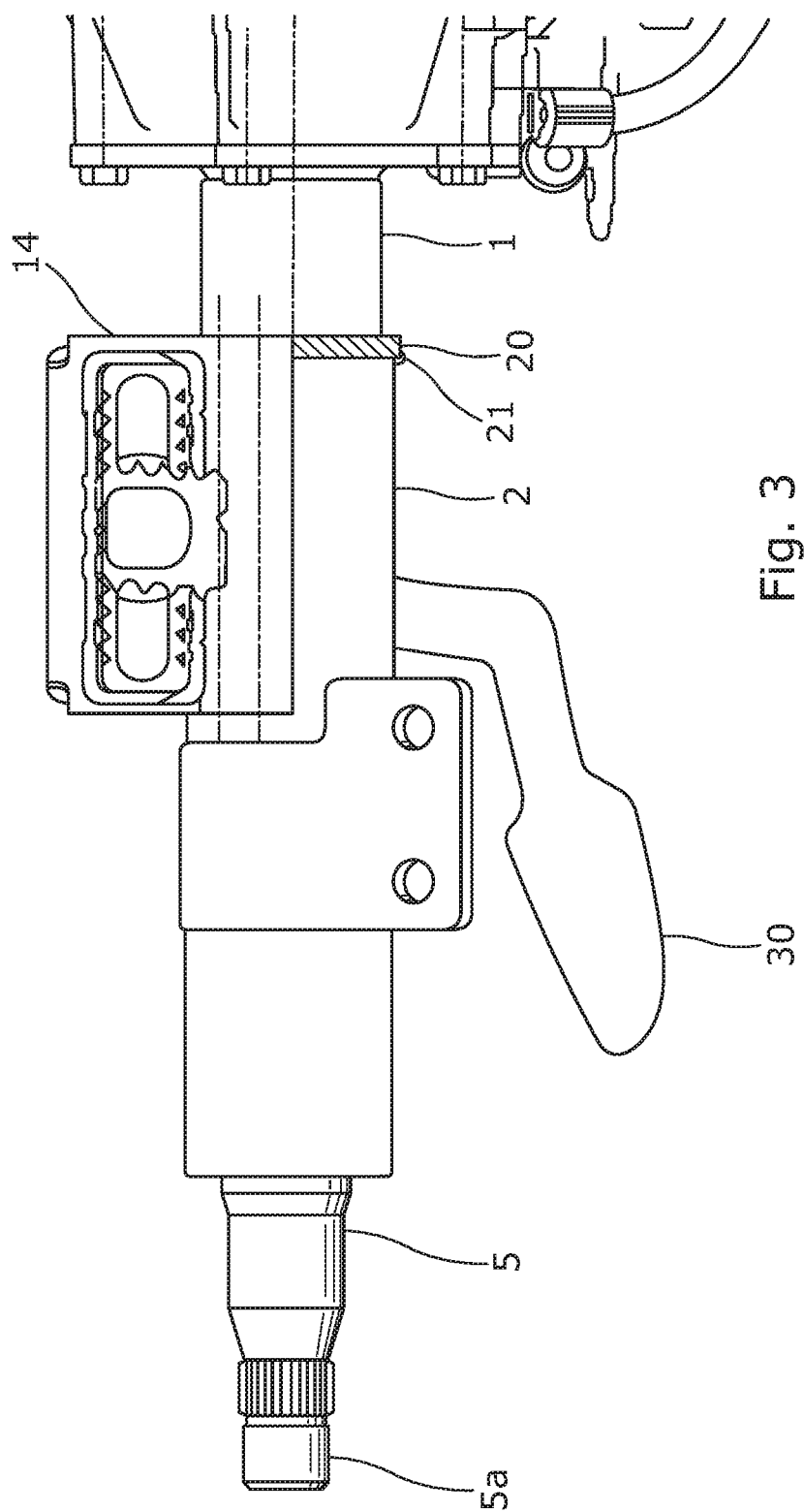
FIG. 3 is a side view of a part of the assembly of FIGS. 1 and 2 with the clamp pin, the bracket and the clamp mechanism removed for clarity.

As shown in FIG. 3, a restraining member 20 is provided that fits around the end 21 of the outer tube 2. In this example, this end is the end of the outer tube 2 that is furthest from the steering wheel. The restraining member 21 as shown in the example is a simple continuous, unitary, ring or hoop of metal of constant thickness defining a hole into which the end of the outer tube is located. The ring and outer tube are centred on a common axis. The inner diameter of the hoop 20 matches the outer diameter of the outer tube when it is allowed to relax into its preferred rest position, or provides a defined restriction on expansion of the outer tube. The hoop therefore limits the maximum expansion of the end of the outer tube 2.

When in the unclamped position, the outer surface of the outer tube 2 fully contact the inner surface of the hoop 20 as shown in FIG. 5. Ideally in this condition the outer tube 2 is perfectly round in cross section, or very slightly compressed, albeit with a section missing where the slot is located. When the clamp mechanism moves to the clamped position the slot 7 in the outer tube 2 closes up, reducing the effective inner "diameter" of the outer tube and pushing it onto the inner tube. The hoop then sits slightly clear of the outer tube as shown in FIGS. 4 and 5 with a gap between the hoop 20 and the outer tube.

To secure the hoop 20 in place, a single spot weld 21 is provided that connects the hoop 20 and outer tube 2 at a portion diametrically opposite the slot 7 as shown in FIG. 5. Securing them at this point ensures the hoop does not restrict the closing of the slot.

The hoop 20 therefore ensures that when the clamp mechanism is released, even if to a point where it applies no clamp load to the arms 13, 14 of the u-shaped bracket, the inner diameter of the outer tube 2 is unable to exceed a predetermined level. This is possible because the hoop controls how far apart the flanges can move, and hence how much the slot in the outer tube 2 can open up. This diameter can be chosen so that it is only slightly larger than the outer diameter of the inner tube. This ensures the inner and outer tubes can slide freely but that there is not excessive lateral free play when unclamped.

The skilled person will also appreciate that in addition to controlling the diameter of the outer tube, it also ensures that the outer tube will not become flared. This benefit is maximised if the hoop is located at the very end of the outer tube, but some benefit is achieved if it is located a small distance along the outer tube from the end.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising:
   an inner tube and an outer tube that surrounds the inner tube along at least part of length thereof, in a relaxed condition the outer tube being a relatively loose fit around the inner tube,
   an elongate slot in the outer tube which can be at least partially closed by applying a load either side of the slot to cause a reduction in an internal diameter of the tube, the slot extending along the outer tube starting from one end of the tube, a pair of flanges which are fixed to the outer tube on opposing sides of the slot, and a clamp mechanism which connects one flange to the other, the clamp mechanism being movable between a clamped position in which it applies a clamping force to the flanges that acts to reduce a width of the slot and so tightens the outer tube around the inner tube, and an unclamped position in which the clamping force is reduced to permit the flanges to move away from one another as the outer tube returns towards its relaxed condition, and further comprising a restraining member that extends around a whole circumference, or substantially around the whole circumference, of a length of the outer tube that is located at, or close to, the end of the outer tube at which the slot starts, the restraining member preventing unwanted deformation of the end of the outer tube.

2. The steering column assembly according to claim 1 in which the restraining member comprises a continuous hoop.

3. The steering column assembly according to claim 1 in which the restraining member comprises a ring.

4. The steering column assembly according to claim 1 in which the restraining member is located substantially at the end of the outer tube so that the restraining member surrounds a circumferential portion of an outer face of the tube that is bounded by an end face of the outer tube.

5. The steering column assembly according to claim 1 in which the restraining member comprises a metal ring.

6. The steering column assembly according to claim 1 in which the restraining member is rigidly secured to the outer tube in at least one location, and in which there is no rigid connection between the outer tube and the restraining means within an angle of at least 45 degrees, each side of the slot in the outer tube.

7. The steering column assembly according to claim 1 in which the inner and outer tubes accommodate a two part collapsible steering shaft.

8. The steering column assembly according to claim 1 in which the outer tube is located closer to a steering wheel than the inner tube, the restraining member being located at the end of the outer tube that is furthest from the steering wheel.

9. The steering column assembly according to claim 1 in which the restraining member is rigidly secured to the outer tube in at least one location, and in which there is no rigid connection between the outer tube and the restraining means within an angle of at least 90 degrees, each side of the slot in the outer tube.

10. The steering column assembly according to claim 1 in which the restraining member is rigidly secured to the outer tube in at least one location, and in which there is no rigid connection between the outer tube and the restraining means within an angle of at least 135 degrees, each side of the slot in the outer tube.

* * * * *